United States Patent
Hars (10) Patent No.: US 10,146,701 B2
(45) Date of Patent: Dec. 4, 2018

(54) ADDRESS-DEPENDENT KEY GENERATION WITH A SUBSTITUTION-PERMUTATION NETWORK

(71) Applicant: The Boeing Company, Huntington Beach, CA (US)

(72) Inventor: Laszlo Hars, Lafayette, CO (US)

(73) Assignee: The Boeing Company, Chicago, IL (US)

( * ) Notice: Subject to any disclaimer, the term of this patent is extended or adjusted under 35 U.S.C. 154(b) by 499 days.

(21) Appl. No.: 14/473,042

(22) Filed: Aug. 29, 2014

(65) Prior Publication Data

US 2016/0062920 A1 Mar. 3, 2016

(51) Int. Cl.
| | |
|---|---|
| *G06F 21/00* | (2013.01) |
| *G06F 12/14* | (2006.01) |
| *H04L 9/06* | (2006.01) |
| *G09C 1/00* | (2006.01) |
| *H04L 9/08* | (2006.01) |

(52) U.S. Cl.
CPC .......... *G06F 12/1408* (2013.01); *G09C 1/00* (2013.01); *H04L 9/0618* (2013.01); *H04L 9/0631* (2013.01); *H04L 9/0866* (2013.01); *G06F 2212/1052* (2013.01); *H04L 2209/04* (2013.01); *H04L 2209/24* (2013.01)

(58) Field of Classification Search
CPC ......... G06F 12/1408; G06F 2212/1052; H04L 9/0631; H04L 9/0866; H04L 9/0618; H04L 2209/04; H04L 2209/24; G09C 1/00
See application file for complete search history.

(56) References Cited

U.S. PATENT DOCUMENTS

| | | | |
|---|---|---|---|
| 5,825,886 A | * 10/1998 | Adams | .......... H04L 9/002 380/28 |
| 7,093,137 B1 | 8/2006 | Sato et al. | |
| 7,469,344 B2 | 12/2008 | Folmsbee | |
| 7,802,108 B1 | 9/2010 | Master et al. | |
| 7,894,599 B2 | 2/2011 | Rigler | |

(Continued)

OTHER PUBLICATIONS

Al-Hazaimeh, "Design of a New Block Cipher Algorithm," IISTE, Network and Complex Systems, vol. 3, No. 8, 2013, 7 pages.

(Continued)

*Primary Examiner* — Mahfuzur Rahman
(74) *Attorney, Agent, or Firm* — Womble Bond Dickinson (US) LLP (57) ABSTRACT

A method of providing security in a computer system includes producing an initial block of data from a respective address of a memory location. An updated block of data may be calculated for each round of a plurality of rounds in a substitution-permutation network. This may include mixing an input block through a substitution layer including a plurality of substitution boxes, and a linear transformation layer including a permutation, to produce the updated block, before or after which respectively the input block or updated block may be mixed with a round key. The input block may be the initial block for the first round, and the updated block for an immediately preceding round for each round thereafter. A block of ciphertext may be produced with a key composed of the updated block for the last round, and the block of ciphertext may be written at the memory location.

18 Claims, 4 Drawing Sheets

(56) References Cited

U.S. PATENT DOCUMENTS

| | | | |
|---|---|---|---|
| 7,937,595 | B1 | 5/2011 | Kumar et al. |
| 8,370,645 | B2 | 2/2013 | Asnaashari |
| 8,504,849 | B2 | 8/2013 | Jogand-Coulomb et al. |
| 9,336,160 | B2* | 5/2016 | Hawkes .............. G06F 12/1408 |
| 2005/0002523 | A1* | 1/2005 | Sonnekalb ............ H04L 9/0625 380/28 |
| 2006/0265563 | A1* | 11/2006 | Goettfert ............. G06F 12/1408 711/164 |
| 2010/0115286 | A1* | 5/2010 | Hawkes .............. G06F 12/1408 713/189 |
| 2013/0117577 | A1 | 5/2013 | Hars et al. |
| 2015/0169472 | A1* | 6/2015 | Yap ..................... G06F 12/1408 713/190 |

OTHER PUBLICATIONS

Beaulieu et al., "The Simon and Speck Families of Lightweight Block Ciphers," NSA, Jun. 2013, 45 pages.

Bogdanov et al., "Present: An Ultra-Lightweight Block Cipher," Cryptographic Hardware and Embedded Systems—CHES 2007, Lecture Notes in Computer Science, vol. 4727, 2007, pp. 450-466.

Hars et al., "Pseudorandom recursions II," EURASIP Journal on Embedded Systems, 2012, 11 pages.

Knudsen et al., "PRINTcipher: A Block Cipher for IC-Printing," Cryptographic Hardware and Embedded Systems, CHES 2010, Lecture Notes in Computer Science, vol. 6225, Aug. 2010, 15 pages.

"Feistel cipher," 2014, Wikipedia article—http://en.wikipedia.org/w/index.php?title=Feistel_cipher&oldid=591294982 [May 27, 2014], 6 pages.

"Linear feedback shift register," 2014, Wikipedia article—http://en.wikipedia.org/w/index.php?title=Linear_feedback_shift_register&oldid=609519852 [May 27, 2014], 10 pages.

"Power analysis," 2014, Wikipedia article—http://en.wikipedia.org/w/index.php?title=Power_analysis&oldid=609430707 [May 27, 2014] 4 pages.

* cited by examiner

ADDRESS-DEPENDENT KEY GENERATION WITH A SUBSTITUTION-PERMUTATION NETWORK

CROSS-REFERENCE TO RELATED APPLICATION(S)

The present application is related to U.S. patent application Ser. No. 13/722,871, entitled: Secure Memory Transaction Unit, filed on Dec. 20, 2012, which is a continuation-in-part of and claims priority to U.S. patent application Ser. No. 13/341,630, entitled: Infinite Key Memory Transaction Unit, filed on Dec. 30, 2011, which in turn claims priority to U.S. Provisional Patent Application No. 61/505,039, entitled: Secure Server for Configuring and Programming Secure Microprocessors and Infinite Key Memory Transaction Unit, filed on Jul. 6, 2011. The contents of all of the aforementioned are incorporated herein by reference in their entireties.

TECHNOLOGICAL FIELD

The present disclosure relates generally to the protection of data in a computer system and, in particular, to the protection of data stored in memory in a computer system, which data is often transferred on one or more buses therein.

BACKGROUND

To provide for secure communications and protection of financial, military, medical or other data requiring a high degree of protection, computer and microprocessor-based systems now implement various security measures. These measures are generally intended to preclude an adversary's illicit access to data stored in a memory being accessed by the microprocessor, for example, because the memory and microprocessor are on the same circuit board and/or coupled by a bus.

Common types of attacks on such processors can be categorized as active or passive attacks. In passive attacks an adversary reads the contents of the memory, in the hope to discover secrets, like passwords, copyrighted material, etc. A passive attacker can also monitor the data traffic between the processor and the memory (or some peripherals) for secrets.

Active attacks attempt to modify the contents of the memory, or the data traffic between the memory and the processor. Active attacks include attempts to copy-and-paste memory blocks between different locations, or playing back earlier content of the same, or another location. Such attacks can cause harm, for example by creating an infinite loop, or otherwise impact the program. In a known data recognition attack, an adversary may attempt to learn an encryption key by watching writes of known data to the same address.

It may therefore be desirable to have a system and method that addresses these challenges, and improves upon existing practices.

BRIEF SUMMARY

A technique has been developed to address malicious attempts to copy-and-paste memory blocks between different locations. This technique involves memory address-dependent encryption and address-dependent data authentication, which can be implemented by a "tweakable" cipher, where part of the key (the tweak value) may depend on the memory location and perhaps other information (e.g., data version value, configuration data). This may provide a desired diversification of the data encryption and authentication. Because this and perhaps other techniques may rely on a number of different, unrelated keys, it may be desirable to have a key generation algorithm that is fast.

In view of the foregoing, example implementations of the present disclosure include a system and method for providing security in a computer system. Example implementations provide an algorithm that may be applied to generate a key for encryption of plaintext. In a number of practical secure computing systems implementing the algorithm, only one or two clock cycles may be necessary to compute a key. In these computing systems, for example, used secret random key material may be stored in flip-flops, which may avoid the need for slow internal memory read operations to access it.

According to one aspect of example implementations, a method of providing security in a computer system is provided. The method includes producing an initial block of data from a respective address of a memory location in a memory that includes a window of memory locations each of which stores a respective block of ciphertext produced with a respective key that changes from memory location to memory location. The method includes calculating an updated block of data for each round of a plurality of rounds in a substitution-permutation network. This may include mixing an input block of data through a substitution layer including a plurality of substitution boxes, and a linear transformation layer including a permutation, to produce the updated block of data. And the input block of data or updated block of data being mixed with a round key respectively before substitution layer or after the linear transformation layer, such as through an arithmetic addition, bitwise exclusive-or (XOR) operation or another appropriate, perhaps more complex operation. For these calculations, input block of data may be the initial block of data for a first of the plurality of rounds, and the updated block of data for an immediately preceding round for each round thereafter. The method may then include producing a block of ciphertext with a key composed of the updated block of data for a last of the plurality of rounds, and performing a write operation to write the block of ciphertext at the memory location having the respective address.

In some examples, the method may further include producing the round key for each round of the plurality of rounds from key material represented as a sequence of blocks. In these examples, producing the round key may include selecting a block from the sequence of blocks as the round key, with the block selected as the round key being different from round to round.

In some examples, calculating the updated block of data may be performed by one or more logic circuits, and include calculating the updated block of data for the last of the plurality of rounds in at most two clock cycles of the one or more logic circuits.

In some examples, the substitution-permutation network may be a 258-bit wide network, and each of the plurality of substitution boxes of the substitution layer may be a 3×3 substitution box.

In some examples, the plurality of substitution boxes of the substitution layer for each round of the plurality of rounds may be based on the following logical function of three variables x, y and z:

$$F(x,y,z) = (x \text{ AND } y) \text{ OR } (\bar{y} \text{ AND } z),$$

Here, $\bar{y}$ represents an inverse of y.

In some examples, at least two of the plurality of substitution boxes of the substitution layer for at least one of the plurality of rounds may be different. And in some examples, the plurality of substitution boxes of the substitution layer may be different between at least two of the plurality of rounds.

In some examples, for each round of the plurality of rounds, the substitution-permutation network may include a mixing operation for the round key, and the substitution and linear transformation layers, exclusive of any other operation.

In some examples, producing the initial block of data may include producing the initial block of data further from a data version value that is updated with each write operation at the memory location having the respective address, such as by concatenating the respective address of the memory location and the data version value. In these examples, each memory location of the window of memory locations may store the respective block of ciphertext produced with the respective key that also depends on the data version value and thereby changes with each write operation.

In some examples, producing the initial block of data may include selecting a subset of a larger block of data that includes the respective address of the memory location. In these examples, for at least one round after the first of the plurality of rounds, calculating the updated block of data may include mixing the round key with another subset of the larger block of data to produce a mixed round key, and mixing the input block of data or updated block of data with the mixed round key respectively before the substitution layer or after the linear transformation layer.

In other aspects of example implementations, a system is included for providing security in a computer system. The features, functions and advantages discussed herein may be achieved independently in various example implementations or may be combined in yet other example implementations further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, for example, reference may be made herein to quantitative measures, values, relationships or the like (e.g., planar, coplanar, perpendicular). Unless otherwise stated, any one or more if not all of these may be absolute or approximate to account for acceptable variations that may occur, such as those due to engineering tolerances or the like. Furthermore, it should be understood that unless otherwise specified, the terms "data," "content," "information," and similar terms may be at times used interchangeably. Like reference numerals refer to like elements throughout.

Figure 1:
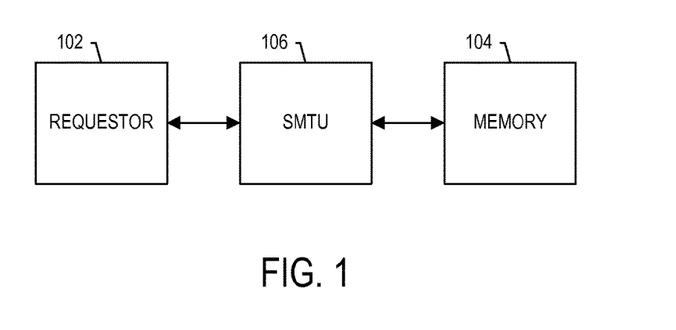
FIG. 1 is an illustration of a system in accordance with example implementations of the present disclosure.

Referring now to FIG. 1, a system 100 is illustrated according to example implementations of the present disclosure. The system may include one or more of each of a number of components, units or the like (generally "components") at least some of which may be composed of logic circuits such as multiplexers, registers, arithmetic logic units, memory, microprocessors and the like. The system may be designed for any of a number of different applications, and may have particular applicability in systems including or coupled to memory susceptible to attacks, such as in-flight computers, military and space programs, corporate network, personal and laptop computers, smart mobile devices. As shown, for example, the system may include one or more components referred to herein as requestors 102 configured to initiate or otherwise request read and/or write transactions (at times referred to as operations) with one or more memories 104, which in some examples may occur on one or more buses between them.

In accordance with example implementations, the system 100 may further include one or more components referred to herein as secure memory transaction units (SMTUs) 106 configured to encrypt and decrypt data transfers between a requestor 102 and memory 104, and may be used in at least some if not all read or write transactions with the memory. And as described below, in some but perhaps not all examples, the SMTUs may also be configured to authenticate the contents of the memory. In various examples, the SMTU design may be memory agnostic in that the type and location of the memory (internal or external) may be "unknown" to the SMTU.

The SMTU 106 may provide, with very high probability, a different encryption key for every location in the memory 104. In some examples, the SMTU may generate these encryption keys using an algorithm referred to herein at times as a double-mix Feistel network (DMFN). The SMTU may use standard encryption algorithms as ciphers, such as a combination of standard operation modes of the Advanced Encryption Standard (AES) cipher, for encryption and authentication of the contents of the memory. Or in some examples, the SMTU may use the DMFN for encryption and authentication. Each amount (e.g., 16 bytes) of plaintext data (sometimes simply referred to as plaintext or data) to be stored at a respective memory location at least within a window of memory locations may be encrypted with a unique encryption key and tagged with a data version value and data authentication tag, which may be stored at the memory location with the encrypted data (at times referred to as ciphertext).

In some examples, the data version value may be derived from a global write counter (GWC) (e.g., 48-bit value) that indicates the number of encrypted write operations that have taken place such as in a current computing session. In other examples, the data version value may be derived using the number of write operations over multiple computing sessions, a time stamp or the like. Or in yet other examples, the data version value may be derived from a clock.

In some examples, the GWC may be reset at the beginning of every session of secure operation. The GWC values may be stored in-the-clear or encrypted with the user data, and modified by a secret mask value before use as part of the key generation. The GWC value may be incremented before any write operation by an increment value, which may be sized similar to the GWC (e.g. 48-bit value). This increment value may be a large odd value that does not have many consecutive 1's or 0's in its binary representation. Examples of suitable increment values are segments of the bit sequences of $\pi$, e, $\sqrt{2}$, $\sqrt{3}$, the golden ratio, etc. Use of values such as these may assure that consecutive GWC values differ in about half the bits, in the average. Use of an odd GWC increment value may assure that the GWC will not wrap around in typical applications for more than ten years of continuous operation.

The data authentication tag at a memory location may depend on the ciphertext at that memory location, and in a manner that is cryptographically secure in that an adversary cannot create a valid data authentication tag, nor may the adversary be able to deduce any information about the ciphertext from the data authentication tag. In some examples, the data authentication tag may serve as a message authentication code, a short piece of information used to authenticate the ciphertext, and to detect data tampering and forgery. The tag may protect both the ciphertext's integrity as well as its authenticity, by allowing detection of any changes to it. In some examples, the tag may be implemented by a block cipher, that is, an algorithm that operates on the ciphertext to perform a transformation specified by a key.

The ciphertext and data authentication tag at a memory location may be produced with keys based on at least the data version value and address of the memory location. The data version value may be updated with each write operation at a memory location, and the key with which the ciphertext is produced may thereby change with each write operation, as well as from memory location to memory location. The data authentication tag may be produced with a second key different from the key that produced the block of ciphertext; but like that key, the second key may change with each write operation and from memory location to memory location. In some examples, a secret random number and other values, such as a security mode value, may be incorporated to further diversify the encryption and authentication. As described herein, the term random may be used broadly to refer to either random or pseudorandom.

During read transactions in which the requestor 102 has requested data from the memory, the SMTU may read previously-encrypted data (ciphertext) from the memory. The encrypted data may be decrypted and authenticated by the SMTU against signs of tampering; and the SMTU may return the decrypted data (plaintext) to the requestor in instances in which the data is considered valid. In write transactions, the SMTU may read the data at a target location, then decrypt and authenticate that data just as with a read access. Once this is complete, the SMTU may cause the data to be written to be merged with the data read from the location, encrypted, and then written back to the memory. As used here, merged means to replace the portion of the data read back that has changed. If desired, a different approach can be used when a complete block of ciphertext is to be written. In these instances, the merge operation may become a replacement, and the initial read operation may be omitted, trading security for speed.

In various examples, a method for providing security for read data being transferred between, or within, units in the system 100 may include dividing the memory 104 into a series of addressable locations (the memory thereby being an addressable memory), each having an address and each storing encrypted data, a data version value (sometimes referred to as version information, or simply as a version value) and a data authentication tag. As described herein, an addressable location of the memory may at times be varyingly but equally referred to as an address, a location or an addressable location. A unique encryption key for the encrypted data, and a different, unique authentication key for the data authentication tag, may be used for each address. These keys may be unpredictable to an adversary, and kept secret before, during and after they are used.

In each read operation, the data version value, data authentication tag and a block of ciphertext may be read at a memory location having a respective address. The respective keys with which the ciphertext and data authentication tag were produced may be regenerated using the data version value and respective address. The ciphertext may be decrypted with its key to produce its corresponding plaintext. And using the second key for the data authentication tag, the ciphertext may be compared with the data authentication tag to verify its integrity and authenticity.

In each write operation, new plaintext data may be written to a memory location in memory 104. In some examples, each write operation may be preceded by a data read at the location and verification of the data by the SMTU 106 as valid. The process of writing data to the memory location may include the SMTU updating the data version value such as to reflect a new number of memory write operations made. The SMTU may then generate another key for encryption of the new data using the updated data version value and respective address of the memory location (and perhaps a random number and/or some other values), and the SMTU may generate a new second key for production of a new data authentication tag that depends on the encrypted new data.

In a further aspect of example implementations of the present disclosure, the SMTU 106 may be configured to implement an address-dependent key generation algorithm with a substitution-permutation network. This network may include a substitution layer including a plurality of smaller, nonlinear substitution boxes (s-boxes), and a linear transformation layer including a permutation, for each of a plurality of iterations or rounds in which the network may be implemented. For each round, an input may be processed by the s-boxes and then be re-routed (permuted) by the permutation, so repeating the operations for multiple rounds may make any one input bit affect more and more other bits, in a nonlinear manner. Either before the substitution layer or after the linear transformation layer, the input or resulting update may be mixed with a round key, such as through an arithmetic addition, bitwise exclusive-or (XOR) operation or another appropriate, perhaps more complex operation. One round of these mixing operations implemented in electronic circuits may be very fast, taking just some 15 . . . 50 gate delays, which may enable the SMTU to perform several rounds in one clock cycle, or two clock cycles in other examples.

According to this further aspect of example implementations, the SMTU 106 may be configured to produce an initial block of data from a respective address of a memory location in a memory that include a window of memory locations each of which stores a respective block of ciphertext produced with a respective key that changes from memory location to memory location. The SMTU may be configured to calculate an updated block of data for each round of a plurality of rounds by mixing an input block of data through a substitution-permutation network that includes for each of a plurality of rounds, a substitution layer including a plurality of substitution boxes, and a linear transformation layer including a permutation. In this regard, the SMTU may be configured to mix an input block of data through the substitution and linear transformation layers to produce the updated block of data. And the input block of data or updated block of data being mixed with a round key respectively before the substitution layer or after the linear transformation layer. For these calculations, the input block of data may be the initial block of data for a first of the plurality of rounds, and the updated block of data for an immediately preceding round for each round thereafter. The SMTU 106 may then be configured to produce a block of ciphertext with a key composed of the updated block of data for a last of the plurality of rounds, and perform a write operation to write the block of ciphertext at the memory location having the respective address.

Although described primarily in the context of encryption, the key generated according to the aforementioned algorithm may be used for either or both encryption or authentication. In examples in which the algorithm is used for both encryption and authentication, the keys generated for both may be independent from one another, which may be accomplished in any of a number of different manners. Suitable techniques for generating independent keys for authentication and encryption include use of independent (round) keys for both, or by using different s-boxes or permutations in respectively the substitution layer and linear transformation layer of the substitution-permutation network.

The substitution-permutation network of example implementations may differ from other, more conventional substitution-permutation networks in a number of respects. For example, the SMTU 106 may be configured to produce the round key for each round of the plurality of rounds from key material represented as a sequence of blocks. The SMTU may then be configured to select a block from the sequence of blocks as the round key, the block selected as the round key being different from round to round. In this manner, the SMTU may use different bits from relatively large key material as truly independent round keys, instead of generating round keys from a smaller cipher key.

In some examples, the SMTU 106 may be configured to generate the key, or more particularly calculate the updated block of data for the last of the plurality of rounds, in at most two clock cycles of the SMTU, which may be far fewer than other substitution-permutation networks require. In some examples, this may be accomplished at least in part due to the resulting encryption keys being kept in secret, thus allowing an adversary to only see data encrypted with these keys. Therefore, only the related key weaknesses of the data encryption algorithm may need to be mitigated by the key generation process (in addition to the diversification of encryptions).

In some examples, the substitution-permutation network may be a larger network than more conventional networks. In an example in which the s-boxes are 3×3 s-boxes (3 input bits mapped to 3 output bits), the total length of the layer may be a multiple of three. And for generating a 256-bit key for AES-256, for example, the width of the network may be at least 86 blocks of 3 bits, all together 86×3=258 bits. Common substitution-permutation networks are typically 48 . . . 80-bit wide networks.

In some examples, the substitution-permutation network may include simpler and faster s-boxes, which as explained in greater detail below, may be based on the following logical function of three variables x, y and z:

$$F(x,y,z)=(x \text{ AND } y) \text{ OR } (\bar{y} \text{ AND } z),$$

where $\bar{y}$ represents an inverse of y. Any of a number of different s-boxes may also be plugged into the network, which may enable use of different s-boxes in any round, and/or between at least two if not all rounds of the network.

In further contrast to some common substitution-permutation networks, the network of some example implementations may include a mixing operation for a truly random round key, and the substitution and linear transformation layers, exclusive of any other operation. This may increase the speed of the network of example implementations, and the truly random round keys may ensure that the security or mixing properties are sufficient.

In some examples, the initial block of data may be diversified based on not only memory location address, but other information such as a data version value, configuration data or the like. For example, the SMTU 106 may be configured to produce the initial block of data further from a data version value that is updated with each write operation at the memory location having the respective address. For this, the SMTU may concatenate the respective address of the memory location and the data version value, perhaps with certain bits repeated and/or inverted to produce an initial block of data of a desired length (e.g., 258 bits). In these examples, each memory location of the window of memory locations stores the respective block of ciphertext produced with the respective key that also depends on the data version value and thereby changes with each write operation.

In some examples, the SMTU 106 being configured to produce the initial block of data includes being configured to select a subset of a larger block of data that includes the respective address of the memory location. Here again, the SMTU may select the subset, and certain of its bits may be repeated and/or inverted to produce an initial block of data of the desired length. In these examples, for at least one round after the first of the plurality of rounds, the SMTU being configured to calculate the updated block of data includes being configured to mix (e.g., bitwise XOR) the round key with another subset of the larger block of data to produce a mixed round key, and mix the input block of data or updated block of data with the mixed round key respectively before the substitution layer or after the linear transformation layer. In some practical systems not all address and other information may be made available at the same time, so this technique may enable the SMTU to start the network as soon as some of those bits become available, and mix in others as they become available.

In instances in which, say, 20 rounds are performed in a 258-bit wide network, 20×258=5,160 bit key material may influence the generated keys. For higher physical security, in some examples, one or more bits of the memory location address and/or other information (e.g., data version value) may cause selection of different blocks of key material, which may provide an overall dependency of the keys from arbitrary large pools.

Figure 2:
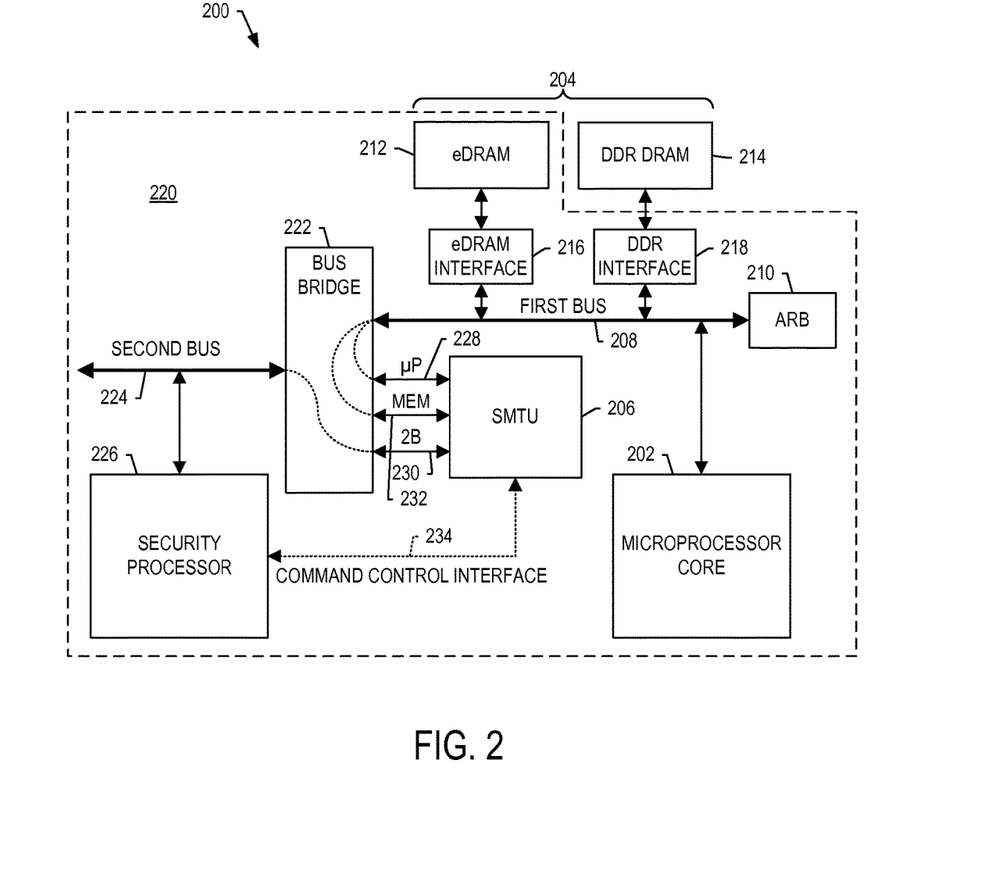
FIG. 2 is an illustration of a system that in some examples may correspond to the system of FIG. 1.

FIG. 2 illustrates one example of a system 200 that in some examples may correspond to the system 100 of FIG.

1. The system may be constructed in accordance with any of a number of different approaches. In some examples, the system may be constructed according to a system-on-chip (SoC) approach in which the components of a system are integrated into a single integrated circuit (IC) (sometimes referred to as a "chip"). In a more particular example, the system may be constructed according to the CoreConnect microprocessor bus-architecture from IBM Corporation. As described herein, various components of the system or functions of components of the system may be described in the nomenclature of a particular technology such as SoC or even CoreConnect. It should be understood that any specific nomenclature used herein is merely for purposes of illustration, and should not be taken to limit the scope of example implementations of the present disclosure.

Similar to the system 100 of FIG. 1, the system 200 of FIG. 2 may include a number of components at least some of which may be composed of logic circuits. As shown, for example, the system may include a microprocessor core 202, memory 204 and SMTU 206, which in some examples may function as or correspond to the requestor 102, memory 104 and SMTU 106 of FIG. 1. Although not shown, it should be understood that the system may include other components that may at times be configured to function as a requestor, which again may be a component configured to initiate or otherwise request read and/or write transactions with memory.

As shown in FIG. 2, the microprocessor core 202 may be directly or indirectly coupled to a first bus 208 along with the memory 204, SMTU 206 and other components, and use of the first bus may be allocated by an arbitration circuit 210. In one example, the microprocessor core may be a PowerPC core commercially available from IBM Corporation, and the first bus may be a processor local bus (PLB). Examples of suitable memory include embedded dynamic access memory (eDRAM) 212, double data rate synchronous (or other) dynamic random access memory (DDR DRAM) 214 or the like, some of which may be coupled to the first bus by respective memory controls or interfaces 216, 218. In some examples in which the system is constructed as a SoC with various components integrated into a single integrated circuit 220, the memory may be off-chip (external) from other components of the system, and may be coupled to the first bus by an on-chip (internal) memory control. This is illustrated, for example, by the DDR DRAM in FIG. 2.

The components coupled to the first bus 208 may also include a bus bridge 222 between the first bus and another, second bus 224 such as a transaction bus to which additional components may be coupled, such as a security processor 226 and perhaps components that may at times function as requestors. In some examples, the first bus may be a high-speed bus with high-performance components coupled thereto, and the second bus may be a low-speed bus. In these examples, the bus bridge may serve to separate the high-performance components from the low-performance components, which may in turn improve system performance.

The SMTU 206 may be configured to encrypt and decrypt data transfers between requestors such as the microprocessor core 202 and either or both of the eDRAM 212 or DDR DRAM 214. The SMTU may act as a slave unit serving read and write requests initiated by the microprocessor core or another requestor, where the SMTU may initiate the read or write as requested from a particular memory address. The SMTU may thereby provide a high level of security for these transactions.

The SMTU 206 may be coupled in the system 200 in any of a number of different manners. As shown, for example, the SMTU may be coupled to the bus bridge 220 by three bidirectional external data interfaces, and may be coupled to the security processor 226 by another bidirectional external data interface. That is, the SMTU may be coupled to the bus bridge by a microprocessor-core interface 228, a second-bus interface 230 and a memory interface 232, and coupled to the security processor by a command-and-control interface 234.

The microprocessor-core interface 228 may be coupled to the microprocessor core 202 via the first bus 208 to receive control information such as requests to read data from and/or write data to memory 204. The second-bus interface 230 may be coupled to the second bus 224, and the memory interface 232 may be coupled to the memory via the first bus. The bus bridge 220 may allow transactions over the microprocessor-core interface and memory interface be routed only to and from the first bus, and the transactions over the second-bus interface to be routed only to and from the second bus. The command-and-control interface 234, then, may enable the security processor 226 to provide command and control information to the SMTU through a separate interface.

Figure 3:
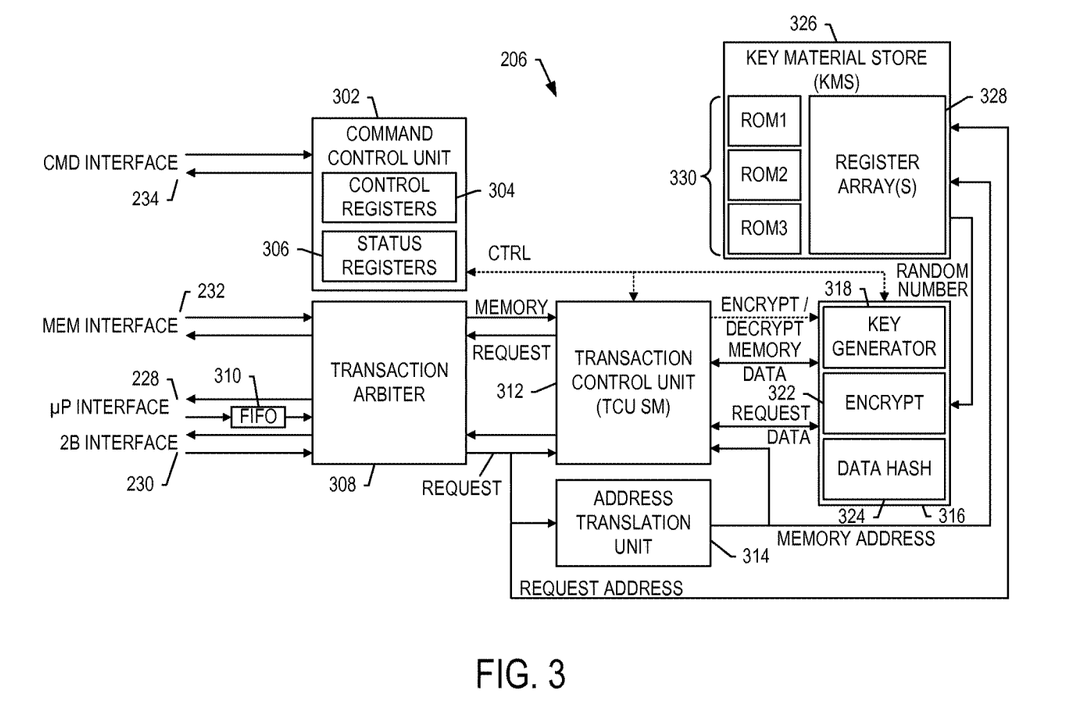
FIG. 3 is an illustration of a secure memory transaction unit, in accordance with example implementations.

FIG. 3 is a diagram illustrating various components of the SMTU 206 of FIG. 2, at least some of which, again, may be composed of logic circuits. As shown, the SMTU may include, and the command-and-control interface 234 may be coupled to, a command control unit 302 having control registers 304 and status registers 306. The SMTU may include a transaction arbiter 308 coupled to and configured to allocate use of the microprocessor-core interface 228, second-bus interface 230 and memory interface 232. A first-in first-out (FIFO) memory 310 on the microprocessor-core interface may be configured to buffer transactions to the arbiter.

The arbiter 308 may also be coupled to a transaction control unit 312 and an address translation unit 314, and the transaction control unit may be in turn coupled to a cryptography unit 316 that provides a key generator 318, encryption unit 320 and data-hashing unit 322. The cryptography unit may be coupled to a key material store (KMS) 326 configured to provide random numbers to the key generator to generate keys for the encryption unit and data-hashing unit. The encryption unit may be configured to encrypt and decrypt data for all read and write operations with an appropriate memory 204 in response to read or write requests invoking the SMTU 206. And the data-hashing unit may be configured to produce data authentication tags for encrypted data (ciphertext) read from and written to the memory. In some examples, the encryption unit may be configured to employ an AES cipher for encryption and decryption operations, and the data-hashing unit may be configured to employ a keyed hash function.

In some examples, the KMS 326 may include one or more register arrays 328 (sometimes referred to as KMS memories) configured to provide random numbers. Because the SMTU relies on random numbers provided by the KMS, the use of high quality random numbers is often desirable. In some examples, then, the KMS may include four 64×64 register arrays that provide 16K-bit random numbers. Prior to operation, the KMS unit may be initialized with 16K-bit random numbers, which in some examples may be generated outside of the SMTU.

As an alternative to using a true random number, in some examples, the KMS 326 may be initialized from one or more onboard configuration/entropy read-only memory blocks (ROMs) 330 such as 512×16 ROMs, three of which are shown as ROM1, ROM2 and ROM3. These ROMs may contain random numbers generated during system design. Using the configuration ROMs as the source of the random numbers may make the generated keys less random, therefore degrading the strength of the anti-tampering mechanism. However, there are applications in which using the ROMs as the random number sources may be desirable. One application is of a time critical application, in which long initialization delays that are associated with generation of the random number are not acceptable. Another type is an application that needs to generate an encrypted data image that can be restored following a system reset or an image that can be restored on a different system.

Further information regarding various features of the system 200 and SMTU 206 according to example implementations may be found below and in the aforementioned, related and incorporated '871 application.

Figure 4:
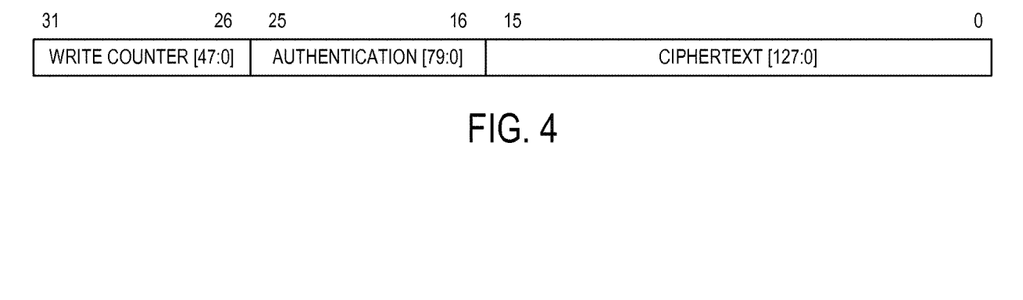
FIG. 4 illustrates the data structure of information stored in a memory location, in accordance with example implementations.

FIG. 4 illustrates the data structure for encrypted data stored in memory 104, 204, according to some example implementations of the present disclosure. As shown, encrypted data may be stored using 32-byte blocks each of which may include 16 bytes of encrypted payload (ciphertext), and 16 bytes of security data. The security data may include 6 bytes of a data version value (in the illustrated example, a write counter value), and 10 bytes of authentication tag. The 6-byte write counter is a field that may be incremented every time a memory location is written, regardless of the address. As a result, the incremented value is unique to each address. The encryption operation and the authentication key for a memory location may be derived from its address, and write counter value, and from a random number. In other examples, more or fewer fields may be used in the encryption. Because every 16 bytes of encrypted data require an additional 16 bytes for an authentication tag and write counter value, the effective data storage capacity of each window of memory locations may be one-half its physical size. But again, in other examples, larger or smaller memories and different data and tag sizes may be implemented.

Figure 5:
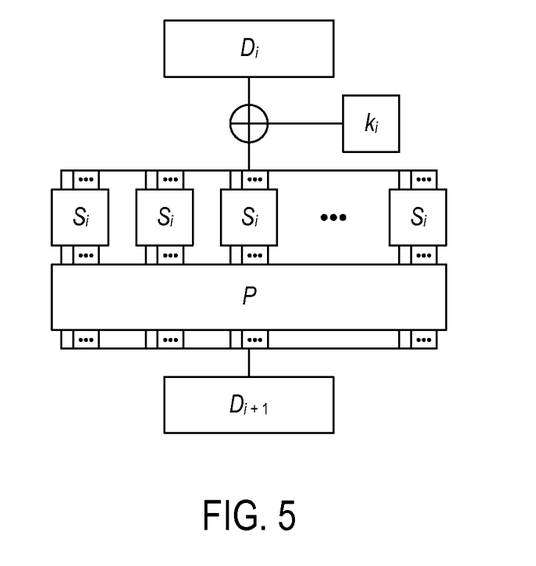
FIGS. 5 and 6 illustrate one round of a substitution-permutation network, in accordance with various example implementations.

FIG. 5 illustrates one round of a substitution-permutation network in accordance with example implementations of the present disclosure. As shown for a round (i), an input block of data ($D_i$) may be mixed (e.g., XOR-ed) with a round key ($k_i$), and the result may be mixed through a substation layer including a plurality of s-boxes ($S_i$), and a linear transformation layer including a permutation (P), to produce an updated block of data ($D_{i+1}$). In another example, the input block of data may be first mixed through the substitution and linear transformation layers to produce the updated block of data, which may then be mixed with the round key ($k_i$). In either example, either or both of the s-boxes and permutation may depend on or be independent of the round. And in some examples, at least two of the s-boxes for at least one of the rounds may be different. In the example of FIG. 5, the s-boxes are shown as depending on the round (e.g., $S_i$), while the permutation is shown as being independent of the round.

Figure 6:
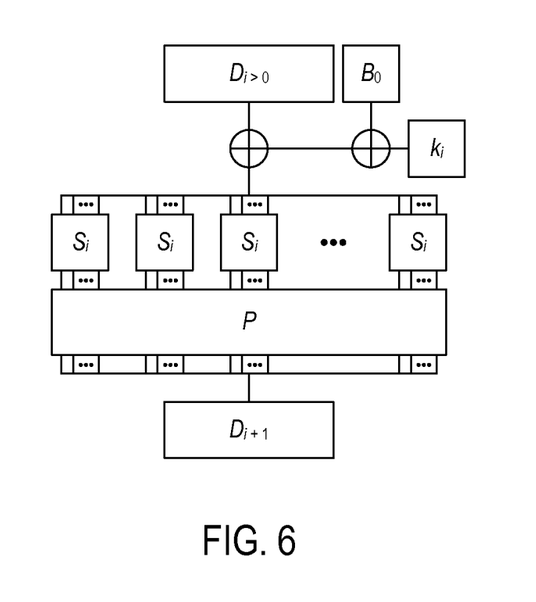

FIG. 6 illustrates one round of a substitution-permutation network in accordance with other example implementations, at least for rounds after the first round (i>0). The substitution-permutation network of FIG. 6 may be similar to that of FIG. 5 except that the initial block of data ($D_0$) may be only a subset of a larger block of data that also includes at least one other subset ($B_0$). In FIG. 6, the round key ($k_i$) may be mixed (e.g., XOR-ed) with the other subset ($B_0$) to produce a mixed round key, and it may be mixed with the input block of data ($D_i$) for the round. Or in another example, the round key may be mixed with the other subset, and the resulting mixed round key may be mixed with the updated block of data ($D_{i+1}$) after the substitution and linear transformation layers.

As also explained above, the substitution-permutation network in some examples may use simpler and faster s-boxes, which may have less thorough mixing properties. This may enable more rounds of the substitution-permutation network to be performed in an allotted amount of time (e.g., one or two clock cycles). The net mixing effects may therefore be better, and more bits of key material may be used.

In some examples, the s-box construction may be based on the following logical function of three variables x, y and z:

$$F(x,y,z) = (x \text{ AND } y) \text{ OR } (\bar{y} \text{ AND } z),$$

where $\bar{y}$ represents an inverse of y. The function F may be computed with approximately the same propagation delay as a single two-input XOR, and may also work as a fast combiner of three bits, even though it is nonlinear (and so it may not be easy to invert).

For the simplicity of the specification of s-boxes, consider S(w, x, y, z) a slightly more general function of OR-AND (or NAND-NAND) structure:

$$S(w,x,y,z) = (w \text{ AND } x) \text{ OR } (y \text{ AND } z) = \text{NAND}(\text{NAND}(w,x), \text{NAND}(y,z))$$

NAND gates are the fastest gates, so this structure may lead to possibly the fastest implementation of three-to-one bit balanced functions in hardware. The worst case propagation delay in the data path may be the aggregated delays of one inverter plus two NAND gates.

Varying the order of the inputs in the function parameters (and their inverses), many different s-boxes may be built and plugged into the substitution-permutation network, which may thereby include different s-boxes between rounds. For example, choosing three independent parameter sets, many very fast 3×3 s-boxes may be derived, such as:

$$[a,b,c] \leftarrow \{S_1(x,y,z), S_2(x,y,z), S_3(x,y,z)\}:$$

a=S(x, y, $\bar{x}$, z)
b=S(x, y, $\bar{x}$, $\bar{z}$)
c=S(x, z, $\bar{x}$, y)

In one round, a substitution-permutation network with 3×3 s-boxes may make a single bit input change affect three output bits. After R rounds, $3^R$ bits may be affected. In examples in which the generated key has a length of 256 bits, the minimum number of rounds that may be required to affect all key bits by any input bit change may be calculated as: R≥log(256)/log(3)=5.05.

In some examples, the initial block of data may include 32 address bits and 48 write counter bits, which may be repeated three times, and to which may be appended 18 constant, configuration bits, for a total of 258 bits. Again for 3×3 s-boxes, this may mean that there are always at least three input bits changed between performing key generations, and that only four rounds may be required to provide sufficient mixing. For 4×4 s-boxes, the minimum number of rounds that may be required to affect all key bits by any input bit change may be calculated as: R≥log(256)/log(4)=4. But an initial 3-fold repetition of the input may not yield sufficient mixing after only three rounds. These larger s-boxes may also be slower than their 3×3 s-box counterparts. In some applications, though, the substitution-permutation network of example implementations may be provided with 4×4 s-boxes in lieu of 3×3 s-boxes.

Returning to FIGS. 2 and 3, at write operation at a memory location in the window of memory locations in the memory 204 according to example implementations may include the microprocessor core 202 generating a request for data at a memory location having a respective address, and providing that address to the memory 204 on the first bus 208. Of course, rather than receiving the address from the microprocessor core, the address may be provided from some other requestor such as a direct memory access (DMA) controller.

The received address may also be provided to the SMTU 206. In some examples, the address may be a logical address, and may be translated by the address translation unit 314 to a physical address. The address may be provided through the transaction control unit 312 to the key generator 318, which may functionally include three key generators, at times referred to herein as key generators W, C and D configured to generate respective keys W, C and D, one or more of which in some examples may be generated according to the above-described algorithm that uses a substitution-permutation network. Each of the three key generators may also receive the random numbers earlier stored or generated in the KMS 326. Stored at the memory location is the write counter value (e.g., data version value), data authentication tag and block of ciphertext, and this information may be provided to the transaction control unit. In some examples, the write counter value may be encrypted, and this encryption can be very simple, and its key can be a predefined constant, without significant loss of security.

The encryption unit 320 or another component of the SMTU 206 may decrypt the write counter value using key W. The encryption unit 320 may decrypt the ciphertext using key C, while the transaction control unit may employ the data-hashing unit 322 to verify the integrity of the ciphertext based on the ciphertext, key D and data authentication tag, and in some examples. Assuming that the integrity of the ciphertext is verified, the decrypted ciphertext (now plaintext) may be rewritten to the memory location. On the other hand, instances in which the ciphertext authenticity is not verified may signal an error.

In instances in which an error occurs, it may indicate that a random error or possible data tampering has occurred, and the transaction control unit 312 may perform any of a number of different actions in response. For example, the transaction control unit may cause the system 200 to (i) stop processing all read and write requests, (ii) delete the random number used for encryption in the current session, (iii) flush all registers that participated in key generation activities, (iv) trigger a memory flush to overwrite the content of the memory window with all zeros, or (v) take other action. In another example, the transaction control unit may maintain a fault counter, which may be incremented in response to an error. In this approach, if a threshold of the number of errors is reached, the transaction control unit may cause any one or more of the aforementioned actions. This approach may be useful in a noisy environment where random memory read errors occasionally occur.

In some examples, a write operation at a memory location in the memory 204 may be preceded by a read operation at the memory location, such as that described above, to verify that the data stored at the memory address is authentic. If prior read is performed, only if the read operation establishes the authenticity of the data, does a write operation occur. In some examples, then, the write operation may include the transaction control unit 312 being configured to merge new data to be written with the decrypted ciphertext (plaintext).

The transaction control unit 312 being configured to increment a GWC, and provide the updated value to each of key generators C and D of key generator 318. Using the incremented write counter value and the address of the memory location, key generators C and D may generate new keys C and D (e.g., using the substitution-permutation-based algorithm), and provide the keys to the encryption unit 320 and data-hashing unit 322, respectively. The encryption unit may use new key C to encrypt the merged plaintext to produce new ciphertext, and the data-hashing unit may use the reproduced ciphertext and key D to produce a new data authentication tag. The combination of key W and the incremented GWC value may be used to provide an encrypted write counter value. The resulting write counter value, data authentication tag and ciphertext may then be returned and written to the memory location.

Figure 7:
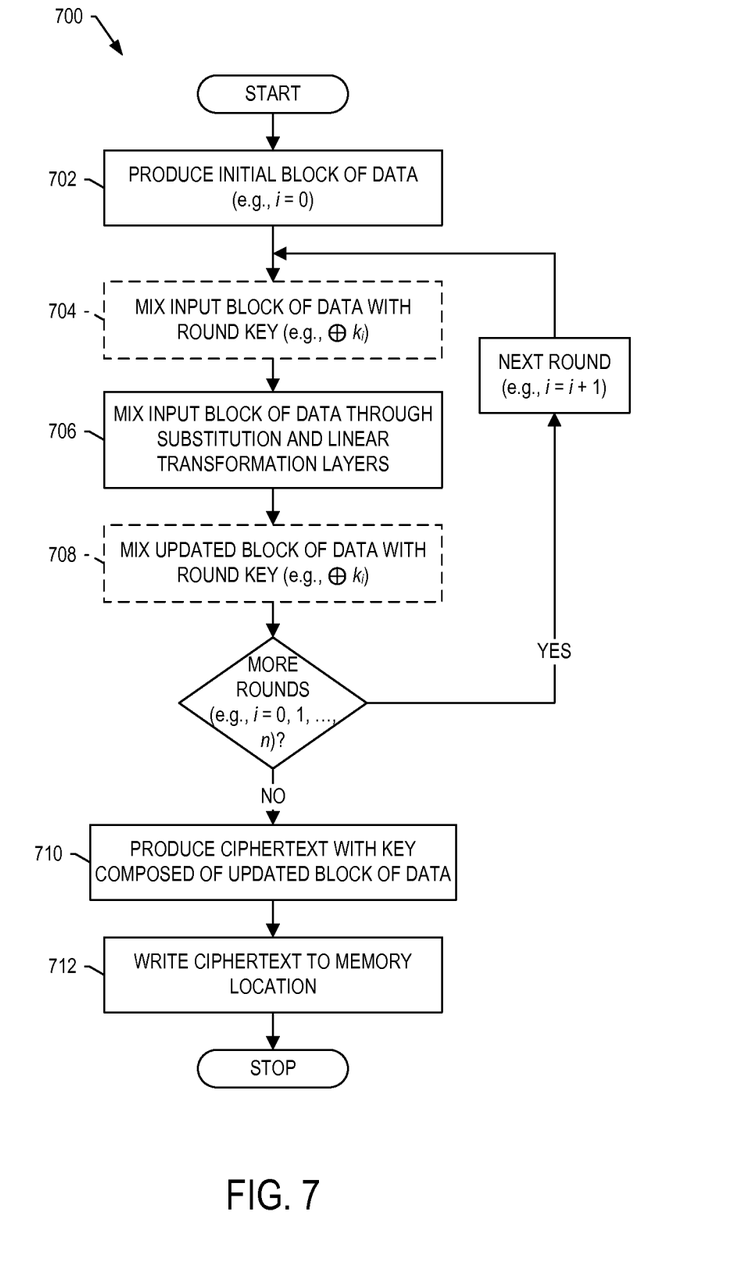
FIG. 7 illustrates a flowchart including various operations in a method according to example implementations.

FIG. 7 illustrates various operations in a method 700 of providing security in a computer system, according to example implementations of the present disclosure. As shown at block 702, the method may include producing an initial block of data from a respective address of a memory location in a memory. The method may include calculating an updated block of data for each round of a plurality of rounds in a substitution-permutation network. This may include mixing an input block of data through a substitution layer including a plurality of substitution boxes, and a linear transformation layer including a permutation, to produce the updated block of data, as shown at block 706. The input block of data or updated block of data being mixed with a round key respectively before the substitution layer or after the linear transformation layer, as shown at alternative blocks 704 and 708. For these calculations, the input block of data may be the initial block of data for a first of the plurality of rounds, and the updated block of data for an immediately preceding round for each round thereafter. The method may include producing a block of ciphertext with a key composed of the updated block of data for a last of the plurality of rounds, as shown at block 710. And the method may include performing a write operation to write the block of ciphertext at the memory location having the respective address, as shown at block 712. In this regard, the memory may include a window of memory locations each of which stores a respective block of ciphertext produced with a respective key that changes from memory location to memory location.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system for providing security in a computer system, the system comprising one or more logic circuits configured to at least:
produce an initial block of data from a respective address of a memory location in a memory, and a data version value that is updated with each write operation at the memory location having the respective address;
generate a key from the initial block of data, including the one or more logic circuits being configured to calculate an updated block of data for each round of a plurality of rounds in a substitution-permutation network, including being configured to mix an input block of data through a substitution layer including a plurality of substitution boxes, and a linear transformation layer including a permutation, to produce the updated block of data, the input block of data or updated block of data being mixed with a round key respectively before the substitution layer or after the linear transformation layer, wherein the input block of data is the initial block of data for a first of the plurality of rounds, and the updated block of data for an immediately preceding round for each round thereafter, and the key is composed of the updated block of data for a last of the plurality of rounds, wherein the one or more logic circuits are further configured to produce the round key for each round of the plurality of rounds from key material represented as a sequence of blocks, including the one or more logic circuits being configured to select a block from the sequence of blocks as the round key, the block selected as the round key being different from round to round;
produce a block of ciphertext with the key; and
perform a write operation to write the block of ciphertext at the memory location having the respective address,
wherein the memory includes a window of memory locations each memory location of which stores a respective block of ciphertext produced with a respective key, and the respective key changes from memory location to memory location, and depends on the data version value and thereby changes with each write operation at each memory location.

2. The system of claim 1, wherein the one or more logic circuits being configured to calculate the updated block of data for the last of the plurality of rounds in at most two clock cycles of the one or more logic circuits.

3. The system of claim 1, wherein the substitution-permutation network is a 258-bit wide network, and each of the plurality of substitution boxes of the substitution layer is a 3×3 substitution box.

4. The system of claim 1, wherein the plurality of substitution boxes of the substitution layer for each round of the plurality of rounds is derived from the following logical function:
S(w, x, y, z)=(w AND x) OR (y AND z), wherein each substitution box is configured to map a plurality of inputs to a plurality of outputs, each output of the plurality of outputs being calculated by application of S(w, x, y, z) to some order and combination of at least some of the plurality of inputs and their inverses.

5. The system of claim 1, wherein at least two of the plurality of substitution boxes of the substitution layer for at least one of the plurality of rounds are different.

6. The system of claim 1, wherein the plurality of substitution boxes of the substitution layer is different between at least two of the plurality of rounds.

7. The system of claim 1, wherein for each round of the plurality of rounds, the substitution-permutation network includes a mixing operation for the round key, and the substitution and linear transformation layers, exclusive of any other operation.

8. The system of claim 1, wherein the one or more logic circuits being configured to produce the initial block of data includes being configured to concatenate the respective address of the memory location and the data version value.

9. The system of claim 1, wherein the one or more logic circuits being configured to produce the initial block of data includes being configured to select a subset of a block of data larger than the initial block and that includes the respective address of the memory location, and
wherein for at least one round after the first of the plurality of rounds, the one or more logic circuits being configured to calculate the updated block of data includes being configured to mix the round key with another subset of the larger block of data to produce a mixed round key, and mix the input block of data or updated block of data with the mixed round key respectively before the substitution layer or after the linear transformation layer.

10. A method of providing security in a computer system, the method comprising:
producing an initial block of data from a respective address of a memory location in a memory, and a data version value that is updated with each write operation at the memory location having the respective address;
generating a key from the initial block of data, including calculating an updated block of data for each round of a plurality of rounds in a substitution-permutation network, including mixing an input block of data through a substitution layer including a plurality of substitution boxes, and a linear transformation layer including a permutation, to produce the updated block of data, the input block of data or updated block of data being mixed with a round key respectively before the substitution layer or after the linear transformation layer, wherein the input block of data is the initial block of data for a first of the plurality of rounds, and the updated block of data for an immediately preceding round for each round thereafter, and the key is composed of the updated block of data for a last of the plurality of rounds, the method further comprising producing the round key for each round of the plurality of rounds from key material represented as a sequence of blocks, producing the round key including selecting a block from the sequence of blocks as the round key, the block selected as the round key being different from round to round;
producing a block of ciphertext with the key; and
performing a write operation to write the block of ciphertext at the memory location having the respective address,
wherein the memory includes a window of memory locations each memory location of which stores a respective block of ciphertext produced with a respective key, and the respective key changes from memory location to memory location, and depends on the data version value and thereby changes with each write operation at each memory location.

11. The method of claim 10, wherein calculating the updated block of data is performed by one or more logic circuits, and includes calculating the updated block of data for the last of the plurality of rounds in at most two clock cycles of the one or more logic circuits.

12. The method of claim 10, wherein the substitution-permutation network is a 258-bit wide network, and each of the plurality of substitution boxes of the substitution layer is a 3×3 substitution box.

13. The method of claim 10, wherein the plurality of substitution boxes of the substitution layer for each round of the plurality of rounds is derived from the following logical function:

$S(w, x, y, z) = (w \text{ AND } x) \text{ OR } (y \text{ AND } z)$, wherein each substitution box is configured to map a plurality of inputs to a plurality of outputs, each output of the plurality of outputs being calculated by application of $S(w, x, y, z)$ to some order and combination of at least some of the plurality of inputs and their inverses.

14. The method of claim 10, wherein at least two of the plurality of substitution boxes of the substitution layer for at least one of the plurality of rounds are different.

15. The method of claim 10, wherein the plurality of substitution boxes of the substitution layer is different between at least two of the plurality of rounds.

16. The method of claim 10, wherein for each round of the plurality of rounds, the substitution-permutation network includes a mixing operation for the round key, and the substitution and linear transformation layers, exclusive of any other operation.

17. The method of claim 10, wherein producing the initial block of data includes concatenating the respective address of the memory location and the data version value.

18. The method of claim 10, wherein producing the initial block of data includes selecting a subset of a block of data larger than the initial block and that includes the respective address of the memory location, and wherein for at least one round after the first of the plurality of rounds, calculating the updated block of data includes mixing the round key with another subset of the larger block of data to produce a mixed round key, and mixing the input block of data or updated block of data with the mixed round key respectively before the substitution layer or after the linear transformation layer.

* * * * *